US008392226B1

(12) United States Patent
Hamm et al.

(10) Patent No.: US 8,392,226 B1
(45) Date of Patent: Mar. 5, 2013

(54) CONTROLLING META-DATA OF INFORMATION RESOURCES

(75) Inventors: Mark D. Hamm, Germantown, TN (US); James B. Greer, Memphis, TN (US); Robert C. Johnson, Germantown, TN (US)

(73) Assignee: Viabridge, Inc., Germantown, TN (US)

( * ) Notice: Subject to any disclaimer, the term of this patent is extended or adjusted under 35 U.S.C. 154(b) by 1827 days.

(21) Appl. No.: 10/700,998

(22) Filed: Nov. 4, 2003

(51) Int. Cl.
*G06Q 10/00* (2012.01)
*G06Q 20/00* (2012.01)

(52) U.S. Cl. .................. 705/7.11; 705/80; 705/309

(58) Field of Classification Search .............. 705/7.11, 705/80, 309
See application file for complete search history.

(56) References Cited

U.S. PATENT DOCUMENTS

| | | | | |
|---|---|---|---|---|
| 5,717,925 | A * | 2/1998 | Harper et al. | 707/102 |
| 5,892,900 | A * | 4/1999 | Ginter et al. | 726/26 |
| 6,078,924 | A * | 6/2000 | Ainsbury et al. | 707/101 |
| 6,873,992 | B1 * | 3/2005 | Thomas | 1/1 |
| 7,051,071 | B2 * | 5/2006 | Stewart et al. | 709/204 |
| 7,181,017 | B1 * | 2/2007 | Nagel et al. | 380/282 |
| 7,343,337 | B1 * | 3/2008 | Cieliebak et al. | 705/36 R |
| 7,490,058 | B2 * | 2/2009 | Dan et al. | 705/35 |
| 7,685,073 | B2 * | 3/2010 | Baker | 705/80 |
| 7,720,968 | B2 * | 5/2010 | Clarke et al. | 709/226 |
| 2002/0091539 | A1 * | 7/2002 | Yin et al. | 705/1 |
| 2002/0095490 | A1 * | 7/2002 | Barker et al. | 709/224 |
| 2002/0099578 | A1 * | 7/2002 | Eicher et al. | 705/7 |
| 2002/0129056 | A1 * | 9/2002 | Conant et al. | 707/511 |
| 2003/0236679 | A1 * | 12/2003 | Galves et al. | 705/1 |
| 2005/0010456 | A1 * | 1/2005 | Chang et al. | 705/7 |
| 2006/0089837 | A1 * | 4/2006 | Adar et al. | 705/1 |

OTHER PUBLICATIONS

Carver, Todd and Vondra, Alberta. Alternative Dispute Resolution: Why it Doesn't Work and Why it Does. Harvard Business Review, May/Jun. 1994, vol. 72 Issue 3, p. 120. retrieved from EBSCOhost Business Source Elite.*
Laycock, Laura Anne. Interest-Based Resolution Compatibility with Canadian Air Force Culture a Conflict Management Study of 8 Wing Trenton. Royal Roads University, Ottawa, ON Canada. Mar. 2009.*
Menassa, Carol Chukri. Quantitative Framework to Evaluate Alternative Dispute Resolution Investments in Architecture Engineering and Construction Projects Using Option and Real Option Theory. University of Illinois at Urbana-Champaign, 2009. retrieved from ProQuest Dissertations and Theses 2009.*
"*Patrol® DashBoard*", bmcsoftware Assuring Business Availability, www.bmc.com , 6 pages, 2001.
"*IBM Tivoli Monitoring*", Manage the performance and availability of your servers and operating systems, Tivoli software, copyright IBM Corporation 2002, 2 pages, 2002.
"*Tivoli monitoring solutions*", Manage the performance and availability of your servers, applications and middleware, Tivoli software, copyright IBM Corporation 2002, 2 pages, 2002.

(Continued)

*Primary Examiner* — Jonathan G Sterrett
*Assistant Examiner* — Stephanie Delich
(74) *Attorney, Agent, or Firm* — Baker Botts L.L.P.

(57) ABSTRACT

Controlling information resources involves accessing a control definition of a number of control definitions associated with a first party and a second party. The first party has a first information resource and the second party has a second information resource, where the first information resource is in communication with the second information resource. The control definitions define a practice for monitoring the second information resource, where each control definition has a condition and a consequence. Meta-data is received from a second monitor of the second information resource, where the meta-data describes operation of the second information resource. The condition is applied to the meta-data in order to monitor the second information resource.

37 Claims, 6 Drawing Sheets

OTHER PUBLICATIONS

"*Understand how your network impacts your business services*", bmcsoftware, Application-Centric Network Management™ Solutions, copyright BMC Software, Inc. 2003, 12 pages, 2003.

"*Tivoli Monitoring Solutions*", Enhance the availability and performance of your e-business applications, Tivoli software, copyright IBM Corporation 2003, 8 pages, 2003.

"*IBM Tivoli Monitoring*", IBM Software, http://www-3.ibm.com/software/tivoli/products/monitor/, 3 pages, Oct. 3, 2003.

"*Products: Patrol® DashBoard*", bmcsoftware, http://www.bmc.com/products/proddocview, copyright BMC Software, Inc., 2 pages, Nov. 4, 2003.

* cited by examiner

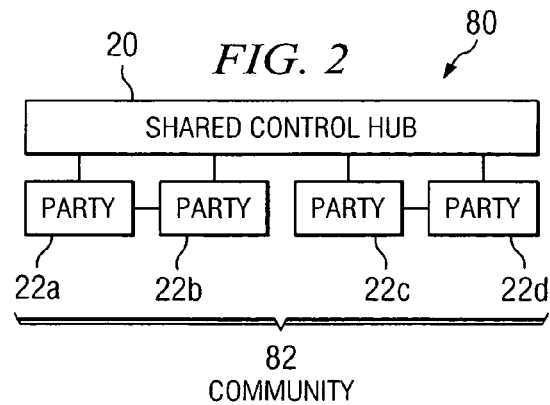

| FULL SET RELATIVE IMPORTANCE ANALYSIS |||
|---|---|---|
| | COMPARED WITH | |
| A - OBJECTIVE 1 | ○ SIGNIFICANTLY MORE IMPORTANT<br>○ SOMEWHAT MORE IMPORTANT<br>○ EQUALLY IMPORTANT<br>○ SOMEWHAT LESS IMPORTANT<br>○ SIGNIFICANTLY LESS IMPORTANT | B - OBJECTIVE 2 |
| A - OBJECTIVE 1 | ○ SIGNIFICANTLY MORE IMPORTANT<br>○ SOMEWHAT MORE IMPORTANT<br>○ EQUALLY IMPORTANT<br>○ SOMEWHAT LESS IMPORTANT<br>○ SIGNIFICANTLY LESS IMPORTANT | C - OBJECTIVE 3 |
| A - OBJECTIVE 1 | ○ SIGNIFICANTLY MORE IMPORTANT<br>○ SOMEWHAT MORE IMPORTANT<br>○ EQUALLY IMPORTANT<br>○ SOMEWHAT LESS IMPORTANT<br>○ SIGNIFICANTLY LESS IMPORTANT | D - OBJECTIVE 4 |

FIG. 6

| 314 312 | A | B | C | D | TOTAL VALUE FOR OBJECTIVE [ %TOTAL] |
|---|---|---|---|---|---|
| A |  | 1/5 | 1 | 10 | 11.2 [33.3] |
| B | 1 |  | 5 | 5 | 11 [32.8] |
| C | 1/10 | 1/10 |  | 5 | 5.2 [15.5] |
| D | 1/5 | 5 | 1 |  | 6.2 [18.5] |
| COLUMN TOTAL | 1.3 | 5.3 | 7 | 20 | 33.6 |

316
310

| LEGEND | |
|---|---|
| 1 | EQUALLY QUICK, ACCEPTABLE BY USERS, ETC. |
| 5 | MUCH QUICKER IMPLEMENTATION, MORE ACCEPTABLE BY USERS, ETC. |
| 10 | SIGNIFICANTLY QUICKER IMPLEMENTATION, MORE ACCEPTABLE BY USERS, ETC. |
| 1/5 | MUCH SLOWER IMPLEMENTATION, LESS ACCEPTABLE BY USERS, ETC. |
| 1/10 | SIGNIFICANTLY SLOWER IMPLEMENTATION, LESS ACCEPTABLE BY USERS, ETC. |

| PRIORITIZATION RESULTS | | |
|---|---|---|
|  | RANK | %TOTAL |
| OBJECTIVE 1 | 1 | 33.3 |
| OBJECTIVE 2 | 2 | 32.8 |
| OBJECTIVE 3 | 3 | 15.5 |
| OBJECTIVE 4 | 4 | 18.5 |
| TOTAL |  | 100.0 |

330

US 8,392,226 B1

CONTROLLING META-DATA OF INFORMATION RESOURCES

TECHNICAL FIELD OF THE INVENTION

This invention relates generally to the field of monitoring systems and more specifically to controlling meta-data of information resources.

BACKGROUND OF THE INVENTION

Businesses typically use information resources that communicate with information resources of other businesses. As an example, a company may have a supply management application that communicates with an order processing application of a supplier. Known monitoring systems may be used to monitor the operation of information resources and may comprise, for example, service management, service level management, and business service management systems. Known monitoring systems, however, typically cannot provide effective and comprehensive monitoring services to businesses. Accordingly, known monitoring systems are not satisfactory in certain situations.

SUMMARY OF THE INVENTION

In accordance with the present invention, disadvantages and problems associated with previous techniques for monitoring information resources may be reduced or eliminated.

According to one embodiment of the present invention, controlling information resources involves accessing a control definition of a number of control definitions associated with a first party and a second party. The first party has a first information resource and the second party has a second information resource, where the first information resource is in communication with the second information resource. The control definitions define a practice for controlling the second information resource, where each control definition has a condition and a consequence. Meta-data is received from a second monitor of the second information resource, where the meta-data describes operation of the second information resource. The condition is applied to the meta-data in order to monitor the second information resource.

Certain embodiments of the invention may provide one or more technical advantages. A technical advantage of one embodiment may be that a shared control hub provides shared control of information resources of different parties. The information resources may communicate information such as business information between themselves, and the shared control hub may monitor meta-data such as vital signs of the information resources. Another technical advantage of one embodiment may be that the shared control hub may include a negotiation engine. The negotiation engine may allow parties to negotiate control definitions that define the control practices for controlling the information resources.

Yet another technical advantage may be that the shared control hub may provide for creation of meta-data if the meta-data is not readily available. Yet another technical advantage may be that the shared control hub may manage meta-data, conditions, and consequences as a shared process.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2 is a block diagram illustrating one embodiment of a system that includes a community of parties;

FIG. 5 illustrates one embodiment of a display that may be used to determine the relative importance of objectives;

FIG. 6 illustrates one embodiment of a display that may be used to summarize the results of a relative importance analysis;

FIG. 7 illustrates one embodiment of a display that may be used to provide prioritization results for an objective.

DETAILED DESCRIPTION OF THE DRAWINGS

Embodiments of the present invention and its advantages are best understood by referring to FIGS. 1 through 8 of the drawings, like numerals being used for like and corresponding parts of the various drawings.

Figure 1:
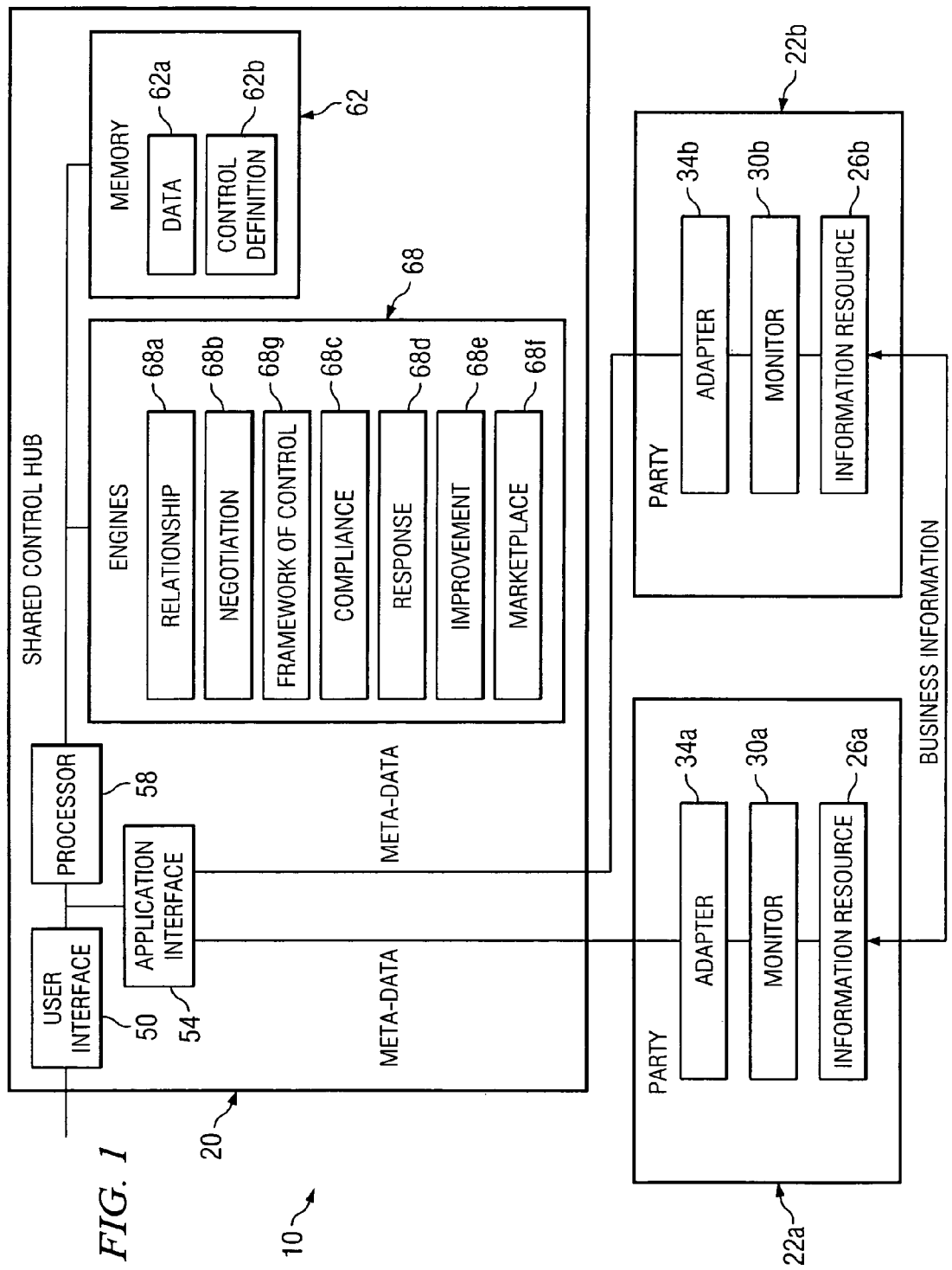
FIG. 1 is a block diagram illustrating one embodiment of a system for providing shared control meta-data of information resources.

FIG. 1 is a block diagram illustrating one embodiment of a system 10 for providing shared control meta-data of information resources. According to the embodiment, system 10 includes a shared control hub that provides shared control of information resources of different parties. The information resources may communicate information such as business information between themselves, and the shared control hub may monitor meta-data such as vital signs of the information resources. Shared control may refer to shared management of monitoring through a common shared control hub using a collection of entities such as monitors and adapters of the parties.

According to the illustrated embodiment, system 10 includes a shared control hub 20 coupled to one or more parties 22*a-b* as illustrated in FIG. 1. A party 22*a-b* may subscribe to shared control hub 20 in order to obtain shared control services. A party 22*a-b* may comprise a business, agency, institution, or other organization that communicates information to other parties 22*a-b*. According to the illustrated embodiment, a party 22*a-b* may include an information resource 26*a-b*, a monitor 30*a-b*, and an adapter 34*a-b* coupled as shown in FIG. 1.

Information resource 26*a-b* may comprise one or more software applications operable to perform specified functions. Examples of information resources 26*a-b* include a product level management application, an enterprise resource planning application, a customer relationship management application, a human resources application, a supply chain management application, or other suitable application. Information resources 26*a-b* may receive information from any suitable entity, for example, a user, a software application, a device, or a database. Information resources 26*a-b* of different parties 22*a-b* may communicate information among themselves. Information may comprise, for example, business information such as sales, product specifications, inventory, pricing, patient health information, security, employment, product, or any other information that may be communicated between information resources 26*a-b* of parties 22*a-b*.

Monitor 30a-b may monitor information resources 26a-b for meta-data. Meta-data may comprise suitable data that describes the operation of information resource 26a-b, such as vital signs describing the operation of information resource 26a-b. Examples of vital signs include availability, performance, change management, and security measures. A monitor 30a-b may comprise a monitoring system such as a managed external monitor or a remote monitor. Types of monitors may include, for example, a systems management monitor, a service level management monitor, a manager of monitors, or a business service management monitor. Adapter 34a-b may include any adapter suitable for providing an interface that exchanges information between shared control hub 20 and party 22a-b.

Shared control hub 20 may be used to provide a life cycle management process for shared monitor data from monitors 30a-b of parties 22a-b. Shared control hub 20 may be used to provide shared control of monitors 30a-b such as a systems management monitor, a service level management monitor, a manager of monitors, or a business service management monitor. Shared control hub 20 may use any suitable framework of control. A shared framework of control refers to a framework of control used by more than one party to organize monitored information. Examples of frameworks of control include the Control Objectives for Informational Technology (CobiT) framework of control, the Committee of Sponsoring Organizations of the Treadway Commission (COSO), or other suitable framework of control.

According to the illustrated embodiment, shared control hub 20 includes a user interface 50, an application interface 52, a processor 58, a memory 62, and one or more engines 68 coupled as shown in FIG. 1. User interface 50 communicates information between a user and shared control hub. The information from the user may include, for example, instructions from the user, and information from the shared control hub 20 may include, for example, a report that describes the meta-data monitored from information resources 26a-b. Application interface 54 communicates information between shared control hub 20 and parties 22a-b. Information from parties 22a-b may include meta-data of information resources 26a-b. Information from shared control hub 20 may include, for example, instructions on how information resources 26a-b are to be monitored.

Processor 58 manages the operation of shared control hub 20. As used in this document, the term "processor" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Memory 62 stores information used by shared control hub 20, and may include Random Access Memory (RAM), Read Only Memory (ROM), a magnetic drive, a disk drive, a Compact Disk (CD) Drive, a Digital Video Disk (DVD) drive, removable media storage, any other suitable data storage device, or a combination of any of the preceding. According to the illustrated embodiment, memory 62 includes data 62a and one or more control definitions 62b.

Data 62a may comprise data generated from information received from parties 22a-b. As an example, data 62a may comprise a parameter and a value. The parameter may comprise a parameter to be measured for an information resource 26a-b, and a value may comprise the actual measurement. According to one embodiment, a parameter may provide meta-data information about an information resource. As an example, a parameter may comprise the percentage of time a system is available, and a value may comprise 95%.

According to one embodiment, data 62a may include statistical data generated from information received from parties 22a-b. As an example, the statistical data may include percent downtime, response rates, and code change times. According to the embodiment, the statistical data may be shared among different parties 22a-b that are obtaining shared control services from shared control hub 20.

Control definitions 62b may comprise control definitions that define how shared control of information resources 26a-b is to be provided. According to one embodiment, control definitions 62b comprise requirements resulting from a negotiation between parties 22a-b. A control definition 62b may be associated with one or more conditions and a consequence. A condition establishes a relationship for one or more parameter values, and may involve applying one or more mathematical operations to the values to calculate a result that is compared to a threshold value. For example, a condition may comprise the availability percentage is greater than or equal to 95%.

A consequence comprises an action that is performed in response to evaluating the values according to the one or more conditions. A consequence may be performed if a value satisfies or does not satisfy a condition. For example, if the availability percentage satisfies the condition that the availability percentage must be greater than or equal to 95%, a consequence may be to continue monitoring the information resource. If the availability percentage does not satisfy the condition that the availability percentage must be greater than or equal to 95%, the consequence may be notify party 24b that the availability percentage is less than 95%. According to one embodiment, a consequence may involve activating a process to respond to the determination of a condition and to settle costs resulting from the condition.

Engines 68 may include one or more engines 68a-e that monitor information resources 26a-b and may perform other operations. According to the illustrated embodiment, engines 68 includes a relationship engine 68a, a negotiation engine 68b, a framework of control engine 68g, a compliance engine 68c, a response engine 68d, and an improvement engine 68e, and a marketplace engine 68f. Engines 68 may, however, include more, fewer, or other engines 68.

According to the embodiment, relationship engine 68a establishes the relationships among parties 22a-b. Establishing the relationships may involve obtaining information about parties 22a-b and associating parties 22a-b that are working together. Negotiation engine 68b manages negotiation between parties 22a-b in order to define control definitions 62b according to which information resources 26a-b are to be controlled. Parties 22a-b may both be on the critical path to allow for simultaneous negotiation.

Framework of control engine 68g provides the method for determining which controls to define and implement. Compliance engine 68c determines whether the meta-data is in compliance with control definitions 62b associated with information resources 26a-b. According to one embodiment, compliance engine 68c monitors meta-data about information resources 26a-b, and determines whether the meta-data satisfies control definitions 62b. If compliance engine 68c determines that there is a violation of a control definition 62b, compliance engine 68c notifies response engine 68d.

Response engine 68d executes a response process and a settlement process in the event that compliance engine 68c notifies response engine 68d that a control definition 62b has been violated. Response engine 68d initiates response and settlement processes appropriate for the particular violation. As an example, a response process may comprise a technical action to mitigate damage, and a settlement process may refer to a fiscal process designed to share costs of the damage.

Improvement engine 68e may be used to change control definitions 62b. Improvement engine 68e continuously or by schedule provides information about opportunities for a change or adjustment. Negotiation engine 68b may be used to negotiate the change. In response to determining that there is an agreed upon change, improvement engine 68e modifies control definitions 62b in accordance with the change.

Marketplace engine 68f provides a virtual marketplace where a vendor may offer a service to parties 22a-b. A service may comprise, for example, a web service performance reporting service or other suitable monitoring service. The service may provide meta-data about information resources 26a-b at one or more parties 22a-b on a scheduled, event-driven, or exception based basis to the shared control hub 20. A party 22a-b may sign up for a service through marketplace engine 68f, and shared control hub 20 may receive a commission for services sold through marketplace engine 68f.

Interfaces 50 and 54, processor 58, memory 62, and engines 68 may be integrated or separated according to particular needs. For example, the present invention contemplates the functions of interfaces 50 and 54, processor 58, memory 62, and engines 68 being provided using one or more computer systems, for example, a single personal computer. If any two modules are separated, the modules may be coupled using a local area network (LAN), a metropolitan area network (MAN), a wide area network (WAN), a global computer network such as the Internet, or any other appropriate wire line, wireless, or other links.

Modifications, additions, or omissions may be made to system 10 without departing from the scope of the invention. For example, system 10 may have more, fewer, or other modules. Moreover, the operations of system 10 may be performed by more, fewer, or other modules. For example, the operations of compliance engine 68c and response engine 68d may be performed by one module, or the operations of compliance engine 68c may be performed by more than one module. Additionally, functions may be performed using any suitable logic comprising software, hardware, other logic, or any suitable combination of the preceding. As used in this document, "each" refers to each member of a set or each member of a subset of a set.

Shared control hub 20 may be used to provide any of a variety of shared control services to parties 22a-b to provide an independent shared life cycle manager of monitors. As an example, party 22a may subscribe to shared control hub 20 to request that shared control hub monitors a firewall of party 22b. If there is an attack of the firewall of party 22b, shared control hub may send a notification to party 22a. As another example, party 22a may use shared control hub 20 to monitor an identification management system of party 22b in order to ensure that unauthorized users are not allowed to access confidential information. If the identification management system is down, shared control hub 20 may notify party 22a. In response, party 22a may deny party 22b access to party 22a. As yet another example, shared control hub 20 may monitor meta-data information received from parties 22a-b, but not business information exchanged between parties 22a-b. Shared control hub 20, of course, may provide shared control of any suitable type of information including meta-data, business, or other suitable type of information.

FIG. 2 is a block diagram illustrating one embodiment of a system 80 that includes a community 82 of parties 22a-d. According to the illustrated embodiment, shared control hub 20 provides shared control to parties 22a-b according to control definitions 62b agreed upon by parties 22a-b. Shared control hub 20 may share data 62a received from parties 22a-d of community 82 with other parties 22a-d of community 82. Each party 22a-d may receive data 62a comprising, for example, statistical data generated from information received from parties 22a-d of community 82.

Modifications, additions, or omissions may be made to system 80 without departing from the scope of the invention. For example, system 80 may have more, fewer, or other parties 22a-d. Moreover, parties 22a-d operations of system 80 may be configured in any suitable manner.

Figure 3:
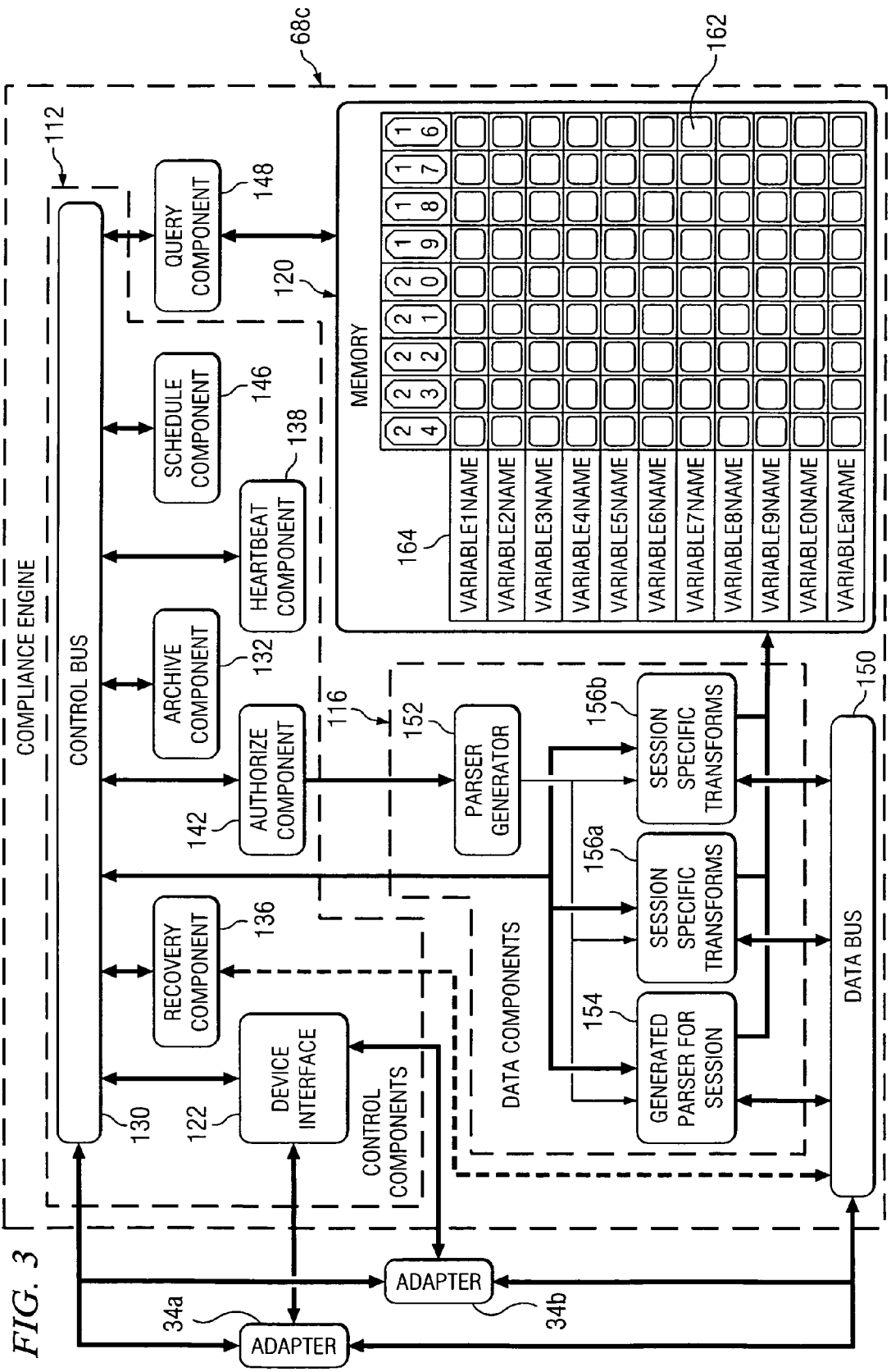
FIG. 3 is a block diagram illustrating one embodiment of a compliance engine of the system of FIG. 1.

FIG. 3 is a block diagram illustrating one embodiment of compliance engine 68c of system 10 of FIG. 1. Adapters 34a-b receive meta-data from monitors 30a-b monitoring information resources 26a-b, and send messages to compliance engine 68c. The messages may include administrative messages and monitoring messages. The administrative messages may include instructions for communicating with adapter 34a-b, and the monitoring messages may include meta-data received from information resources 26a-b.

According to the illustrated embodiment, compliance engine 68c includes one or more control components 112, one or more data components 116, and a memory 120. Administrative messages are directed to control components 112, and monitoring messages are directed toward data components 116. Control components 112 instruct data components 116 to listen for specific messages from adapters 34a-b. Data components 116 listen for and retrieve specific messages, and store the messages in memory 120.

Control components 112 include a control bus 130, a device interface 122, an archive component 132, a recovery component 136, a heartbeat component 138, an authorize component 142, a schedule component 146, and a query component 148 coupled as shown in FIG. 3. Device interface 122 communicates messages between adapters 34a-b and compliance engine 68c. Device interface 122 may comprise, for example, a middleware messaging system such as a Java Messaging System (JMS). Control bus 130 communicates messages among adapters 34a-b, control components 112, and memory 120. Archive component 132 retrieves old data stored at memory 120 and archives the old data.

Recovery component 136 performs recovery operations in the event of an improper shutdown. For example, recovery component 136 may be active during the startup process of compliance engine 68c. If compliance engine 68c shuts down improperly, recovery component 136 restores data into memory 120 upon restart. Data may be restored by recreating changes to memory 120 in the order that they were performed according to an activity log. Recovery component 136 may also prevent compliance engine 68c from evaluating data in memory 120 until the data has been restored. Heartbeat component 138 checks to see that the other components are alive in order to maintain the integrity of compliance engine 68c.

Authorize component 142 initiates creation of a component for monitoring an adapter 34a-b and determines whether a particular adapter 34a-b is authorized to communicate with compliance engine 68c. According to one embodiment, authorize component 142 receives an initial message from adapter 34a. The initial message includes information about adapter 34a that authorize component 142 may use to create a component that listens to messages from adapter 34a. Authorize component 142 initiates the creation of the component by notifying a data component 116 of the initial message. Authorize component 142 also determines whether messages are received from valid adapters 34a-b.

Schedule component 146 is used to set the intervals at which a control definition 62b is evaluated, and executes the control definition 62b according to the schedule. Query component 148 retrieves values from memory 120 in response to instructions from schedule component 146.

Data components 116 include a data bus 150, a parser generator 152, a generated parser for session 154, and one or more session specific transformations 156a-b coupled as illustrated in FIG. 3. Data bus 150 communicates monitoring messages among adapters 34a-b and data components 116. Parser generator 152 generates components for listening to adapters 34a-b in response to a notification from authorize component 142. Generated parser for session 154 and session specific transformations 156a-b listen for and retrieve specific messages from adapters 34a-b. Components 154 and 156a-b select certain values from the messages according to the specified control definitions 62b, and save the values in memory 120. Memory 120 stores values for parameters. According to the illustrated embodiment, memory 120 includes fields 162 where values for parameters identified by parameter names 164 may be stored.

Modifications, additions, or omissions may be made to compliance engine 68c without departing from the scope of the invention. For example, compliance engine 68c may have more, fewer, or other modules. Moreover, the operations of compliance engine 68c may be performed by more, fewer, or other modules. For example, the operations of authorize component 142 and parser generator 152 may be performed by one module, or the operations of schedule component 146 may be performed by more than one module. Additionally, functions may be performed using any suitable logic comprising software, hardware, other logic, or any suitable combination of the preceding.

Figure 4:
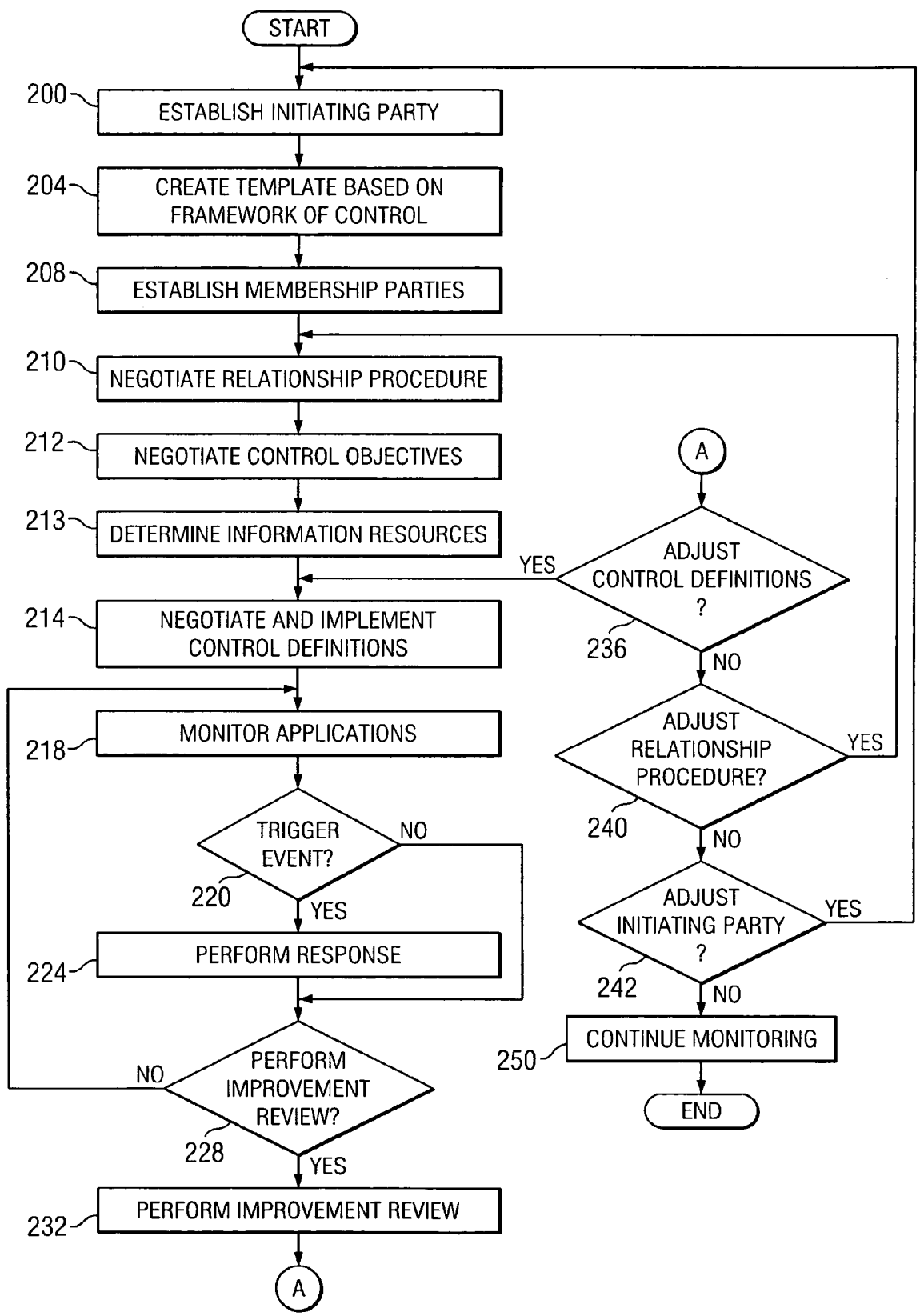
FIG. 4 is a flowchart illustrating one embodiment of a method for providing shared control information resources.

FIG. 4 is a flowchart illustrating one embodiment of a method for providing shared control of information resources. For the purposes of illustration only, the embodiment of the method is described for an initiating party 22a that is looking for a membership party 22b to assemble and ship cellular phones for initiating party 22a. The method may, however, of course be used for any other suitable business relationship without departing from the scope of the invention.

The method begins at step 200, where an initiating party 22a is established. Initiating party 22a may comprise a party that is interested in obtaining shared control services from shared control hub 20. Initiating party 22a may be established by having initiating party 22a sign up for the services through, for example, a web site for shared control hub 20. Signing up for the services may include providing contact information, billing information, authorized user information, other suitable information, or any combination of the preceding. Establishing initiating party 22a may also involve selecting a specific type of shared control service for initiating party 22a and determining an information chain describing how data flows within initiating party 22a, for example, how data flows among information resources 26a.

A template that may be used to communicate the objectives of initiating party 22a to membership parties 22b is created based on the framework of control at step 204. The template may be used as a starting point for negotiation with membership party 22b. Framework of control engine 68g may provide the method for determining which controls to define and implement. Creating a template may include identifying and analyzing business relationships, objectives, and concerns of initiating party 22a. The analysis may be performed according to a Control Objectives for Informational Technology (CobiT) procedure. The CobiT analysis may produce a ranked list of control objectives for the template. A control objective may comprise an objective that expresses a desired outcome of initiating party 22a. A control objective may be used to initiate negotiation among parties 22a-b.

According to the example, objectives for initiating party 22a may include, for example, effective communication of order information, security of customer information, adequate supply of material, prompt communication of material availability, efficient communication of shipping information, and on-time delivery of product. According to the example, initiating party 22a may be particularly concerned that membership party 22b can send shipment information to initiating party 22a within a critical shipment window to allow initiating party 22a to promptly submit orders to membership party 22b.

Concerns of initiating party 22a may include, for example, availability of information resources 26b of membership party 22b during the critical shipment window, notification of initiating party 22a and membership party 22b of changes to software or hardware that could impact data communication, effective communication and management of software updates, and protection of customer information. According to the example, the highest priority control objective is to ensure the availability of information resources 26b during the critical daily shipment communication window. Initiating party 22a requests a 99.7% availability during the critical shipment window. Membership parties 22b are established at step 208. Membership parties 22b may include one or more parties that are or plan to be in communication with initiating party 22a. Membership parties 22b may be established by inviting membership party 22b to work with initiating party 22a, subject to the control objectives of initiating party 22a. Shared control hub 20 may send an invitation to membership parties 22b to invite membership parties 22b to participate in the shared control process, and may provide information from the template describing the control objectives to membership parties 22b. The invitation may have any suitable format, for example, an electronic mail message format that includes a URL for a web site that displays information from the template. Membership party 22b may accept, reject, or counter one or more of the proposed control objectives. According to the example, membership party 22b accepts and signs up with shared control hub 20. Membership party 22b may also be instructed on how to use the services provided by shared control hub 20.

The relationship procedure is negotiated at step 210. A relationship procedure may refer to the procedure according to which parties 22a-b perform negotiations. For example, parties 22a-b may work in parallel where each party 22a-b presents a proposal for the other party 22a-b to consider. As another example, parties 22a-b may perform in a sequential manner, where initiating party 22a presents a proposal to membership party 22b. Membership party 22b may revise the proposal and then send it back to initiating party 22a. As another example, a third party consultant may make decisions for both parties 22a-b.

Control objectives are negotiated at step 212. Control objectives may be negotiated by having parties 22a-b define and prioritize their objectives using negotiation engine 68b. Relationship module 68a may then filter the objectives according to the priorities to generate resulting control objectives that may be more agreeable to parties 22a-b. Displays for negotiating objectives are described in more detail with reference to FIGS. 5 through 8. According to the example, membership party 22b agrees to accept the highest priority objective of 99.7% availability during the critical shipment window.

Information resources are determined at step 213. Information resources may comprise resources used to communicate information between information resources 26a-b and to communicate meta-data between parties 22a-b and shared control hub 20. According to the example, information resources of initiating party 22a includes an enterprise resource planning system on a local area network that is monitored by a monitoring system. A T1 line is used to communicate information between parties 22a-b. A technical support person manages the systems, and a business person is responsible for order information. Information resources for membership party 22b includes an inventory system operating on a local area network, which is monitored by a monitoring system. A technical support person manages the systems, and a business person is responsible for shipment information.

Control definitions 62b are negotiated and implemented at step 214. Control definitions 62b may be used to define the control practices for shared control of parties 22a-b, and may be negotiated using negotiation engine 68b. The control definitions 62b of the shared control services may include, for example, measured values, one or more conditions that may be applied to the measured values, and one or more consequences resulting from the application of the condition to the values. Negotiation may also involve negotiation of the implementation of control definitions 62b. Additional decisions that may be made may involve, for example, a schedule, adapters, meta-data feed, and thresholds.

According to the example, initiating party 22a proposes one or more control definitions 62b that describe a control practice. The monitoring system of initiating party 22a sends an alert to the technical support person of initiating party 22a if the systems or networks of initiating party 22a are down during the critical shipment window. Similarly, the monitoring system of membership party 22b sends an alert to the technical support person of membership party 22b if the networks or systems of membership party 22b are down during the critical shipment window. If the network or systems of either party 22a-b are down for more than ten minutes during the critical shipment window, the monitoring system of the party 22a-b sends a notification to both parties 22a-b through shared control hub 20. According to the example, membership party 22b agrees to the one or more control definitions 62b by sending an acceptance to the shared control hub 20. Control definitions may be implemented by obtaining or developing data feeds or repurposing existing monitors.

Compliance engine 68c monitors information resources 26a-b according to the negotiated control definitions 62b at step 218. A trigger event that triggers a response may occur at step 220. A trigger event may include, for example, determining that an information resource 26a-b does not satisfy a condition of a control definition 62b. According to the example, the trigger event comprises determining that the systems of initiating party 22a are down during the critical shipment window for more than ten minutes. If a trigger event occurs, the method proceeds to step 224, where response engine 68d performs a response. According to the example, the response comprises sending a notification to both parties 22a-b. If no trigger event occurs, the method proceeds directly to step 228.

A decision to perform an improvement review may be made at step 228. The decision to perform the improvement review may be made in any suitable manner. For example, an improvement review may be performed in response to a trigger event or according to a schedule. As another example, shared control hub 20 may notify a party 22a that a control definition used by party 22a might not be satisfactory with respect to information provided by community 82, and party 22a may decide to perform an improvement review in response to the notification. If an improvement review is not to be performed at step 228, the method returns to step 218 to continue monitoring information resources 26a-b.

If an improvement review is to be performed at step 228, the method proceeds to step 232, where the improvement review is performed. The improvement review may indicate that one or more control definitions, the relationship procedure, the initiating party 22a, or any combination of the proceeding may need to be adjusted. The method proceeds to step 236, where control definitions 62b may be adjusted. Control definitions 62b may be adjusted in response to determining that an existing control definition 62b does not provide satisfactory results. According to the example, initiating party 22a realizes that their technical support person receives two alerts for the same failure, one from their monitoring system and one from shared control hub 20. Initiating party 22a also realizes that if their monitoring system is down, the system does not send an alert to shared control hub 20.

If control definitions 62b are to be adjusted at step 236, the method returns to step 214 to renegotiate the control definitions 62b. For example, initiating party 22a proposes to eliminate the control practice of notifying shared control hub 20 that the systems are down, and add the control practice of monitoring the monitoring system of initiating party 22a. If the control definitions 62b do not need to be adjusted at step 236, the method proceeds to step 240. If the relationship procedure needs to be adjusted at step 240, the method returns to step 210 where the relationship procedure is renegotiated. If the relationship procedure does not need to be adjusted at step 210, the method proceeds to step 242. If the initiating party needs to be adjusted at step 242, the method returns to step 200 where the initiating party is reestablished. If the initiating party does not need to be adjusted at step 242, the method proceeds to step 250, where shared control hub 20 continues to monitor parties 22a-b. After continuing monitoring, the method terminates.

Modifications, additions, or omissions may be made to the method without departing from the scope of the invention. Additionally, steps may be performed in any suitable order without departing from the scope of the invention.

FIG. 5 illustrates one embodiment of a display 300 that may be used to determine the relative importance of objectives. According to the embodiment, a list of objectives 1 through 4 may be displayed to parties 22a-b. According to the illustrated embodiment, A represents objective 1, B represents objective 2, C represents objective 3, and D represents objective 4. Each party 22a-b may rank the importance of each objective compared with the other objectives using display 300.

According to the illustrated example, values are given to the evaluated objective to reflect its importance as compared with the other objectives. For example, if an evaluated objective is rated as significantly more important as another objective, the evaluated objective compared with the other objective may be given a value of ten. In addition, a rating of somewhat more important may result in a value of seven, a rating of equally important may result in a value of five, a rating of less important may result in a value of three, and a rating of significantly less important may result in a value of one.

FIG. 6 illustrates one embodiment of a display 310 that may be used to summarize the results of the relative importance analysis. A column 312 lists the objectives being evaluated, and row 314 lists the objectives with which the evaluated objective is being compared. A column 316 displays the total value for the evaluated objective, which may be generated by adding the values of the evaluated objective compared with the other objectives. The percentage value may also be provided. A legend 320 may be used to describe the percentage values.

FIG. 7 illustrates one embodiment of a display 330 that may be used to provide the prioritization results of the objective. Display 330 may provide the percentage value from display 310 of FIG. 6, and may also display a ranking according to the percentage value.

Figure 8:
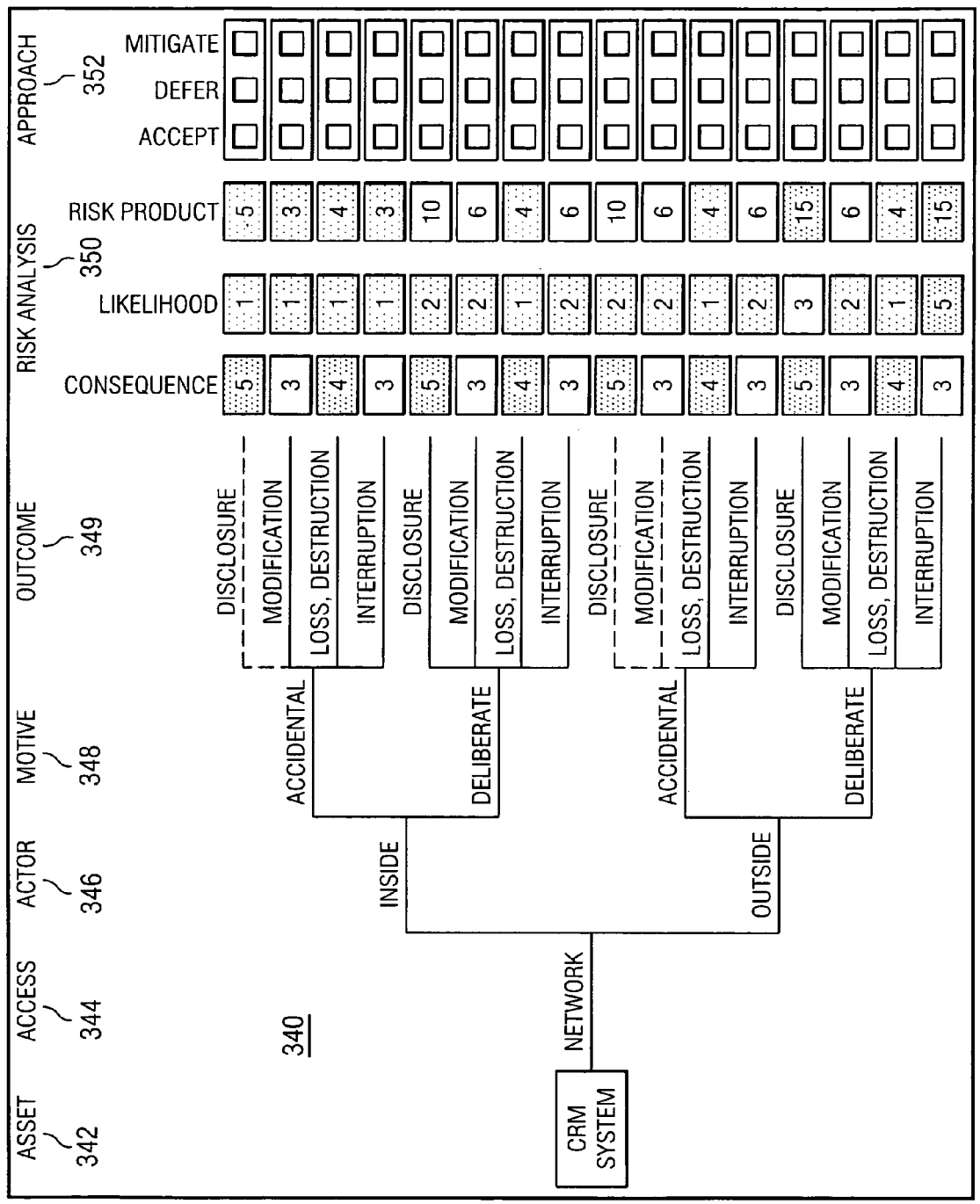
FIG. 8 illustrates one embodiment of a display that may be used to provide risk analysis results.

FIG. 8 illustrates one embodiment of a display 340 that may be used to provide results from a risk analysis, and may allow parties 22a-b to select to accept, defer, or mitigate the risk. Display 340 presents information about an asset 342 and access 342 to asset 342. One or more actors 346 may access asset 342, and may have certain motives 348 to bring about certain undesirable outcomes 346. According to the illustrated embodiment, asset 342 comprises a customer relationship management (CRM) system, which may be accessed by a network. Inside and outside actors 346 may have accidental or deliberate motives 348 to bring about certain outcomes 346. According to the illustrated embodiment, outcomes 346 may comprise disclosure, modification, or loss or destruction of information, or an interruption in the operation of the customer relation management system.

Display 340 presents a risk analysis 350 that presents ratings for the severity of the consequence of the outcome 346, and the likelihood of the occurrence of the outcome 346. A risk product may be calculated from the consequence and the likelihood by, for example, multiplying the value of the consequence by the value of the likelihood. A party 22a-b may use an approach section 352 to select whether to accept, defer, or mitigate the risk.

Modifications, additions, or omissions may be made to displays 300, 310, 330, and 340 of FIGS. 5 through 8 without departing from the scope of the invention. For example, displays 300, 310, 330, and 340 may include more, less, or other information which may be displayed many suitable configuration.

Certain embodiments of the invention may provide one or more technical advantages. A technical advantage of one embodiment may be that a shared control hub provides shared control of information resources of different parties. The information resources may communicate information such as business information between themselves, and the shared control hub may monitor meta-data such as vital signs of the information resources. Another technical advantage of one embodiment may be that the shared control hub may include a negotiation engine. The negotiation engine may allow parties to negotiate control definitions that define the control practices for monitoring the information resources.

Although an embodiment of the invention and its advantages are described in detail, a person skilled in the art could make various alterations, additions, and omissions without departing from the spirit and scope of the present invention as defined by the appended claims.

What is claimed is:

1. A method for controlling one or more information resources, comprising:
　　establishing, by a processor of a shared control hub, a relationship between a first party and a second party based on information about the first party and the second party prior to initiating a negotiation between the first party and the second party, the relationship defining at least in part how the first party and the second party negotiate a control definition of one or more control definitions associated with the first party and the second party;
　　initiating, after establishing the relationship between the first party and the second party, by the processor of the shared control hub, the negotiation between the first party and the second party of the control definition of the one or more control definitions associated with the first party and the second party using the established relationship, the shared control hub not a party of the negotiation, the control definition defined according to a shared framework of control, the first party having a first information resource distinct from the processor, the second party having a second information resource distinct from the processor, the first information resource exchanging business information with the second information resource, the one or more control definitions defining a practice for monitoring the first information resource and the second information resource, each control definition of the one or more control definitions having a condition and a consequence;
　　communicating, by the processor, a proposal for the condition of the control definition between the first party and the second party, the proposal proposing a first parameter describing a first vital sign indicating operation of the first information resource and a second parameter describing a second vital sign indicating operation of the second information resource;
　　receiving meta-data from a first monitor corresponding to the first information resource and a second monitor corresponding to the second information resource, the meta-data describing the first vital sign indicating operation of the first information resource and the second vital sign indicating operation of the second information resource;
　　applying, by the processor, the condition of the control definition of the one or more control definitions to the meta-data in order to monitor the first information resource and the second information resource;
　　determining from the meta-data that there is a violation of the control definition; and
　　notifying the first party and the second party.

2. The method of claim 1, further comprising initiating the consequence in accordance with the application of the condition to the meta-data.

3. The method of claim 1, further comprising initiating a response process to mitigate damage in accordance with the application of the condition to the meta-data.

4. The method of claim 1, further comprising generating a template corresponding to the first party, the template comprising a control objective of the first party.

5. The method of claim 1, further comprising:
　　generating a template corresponding to the first party, the template comprising a control objective of the first party; and
　　providing the template to the second party to initiate negotiation between the first party and the second party.

6. The method of claim 1, further comprising negotiating the control definition of the one or more control definitions.

7. The method of claim 1, further comprising:
　　determining a control objective agreed upon by the first party and the second party;
　　generating the control definition of the one or more control definitions in accordance with the control objective; and
　　negotiating the control definition of the one or more control definitions.

8. The method of claim 1, further comprising:
　　establishing a community comprising the first party, the second party, and a third party having a third information resource;

collecting data associated with the one or more control definitions; and reporting the data.

9. The method of claim 1, further comprising:

collecting data associated with the one or more control definitions;

generating a statistic using the data; and reporting the statistic.

10. The method of claim 1, further comprising:

providing access to a third party monitoring service to the second party; and receiving the meta-data from the second monitor through the third party monitoring service.

11. The method of claim 1, further comprising testing the control definition to determine whether the control definition operates as defined.

12. The method of claim 1, further comprising:

identifying an opportunity to change the one or more control definitions; and changing the one or more control definitions in response to identifying the opportunity.

13. A system for controlling one or more information resources, comprising:

a computer memory and a processor of a shared control hub configured to:

establish a relationship between a first party and a second party based on information about the first party and the second party prior to initiating a negotiation between the first party and the second party, the relationship defining at least in part how the first party and the second party negotiate a control definition of one or more control definitions associated with the first party and the second party;

initiate after establishing the relationship between the first party and the second party, negotiation between the first party and the second party of the control definition of the one or more control definitions associated with the first party and the second party using the established relationship, the shared control hub not a party of the negotiation, the control definition defined according to a shared framework of control, the first party having a first information resource distinct from the processor, the second party having a second information resource distinct from the processor, the first information resource exchanging business information with the second information resource, the one or more control definitions defining a practice for monitoring the first information resource and the second information resource, each control definition of the one or more control definitions having a condition and a consequence;

communicate a proposal for the condition of the control definition between the first party and the second party, the proposal proposing a first parameter describing a first vital sign indicating operation of, the first information resource and a second parameter describing a second vital sign indicating operation of the second information resource; and receive meta-data from a first monitor corresponding to the first information resource and a second monitor corresponding to the second information resource, the meta-data describing the first vital sign indicating operation of the first information resource and the second vital sign indicating operation of the second information resource;

a compliance engine coupled to the memory and to the interface, the compliance engine configured to apply the condition of the control definition of the one or more control definitions to the meta-data in order to monitor the first information resource and the second information resource, the compliance engine configured to determine from the meta-data that there is a violation of the control definition; and a response engine configured to notify the first party and the second party.

14. The system of claim 13, the response engine configured to initiate the consequence in accordance with the application of the condition to the meta-data.

15. The system of claim 13, the response engine configured to initiate a response process to mitigate damage in accordance with the application of the condition to the meta-data.

16. The system of claim 13, further comprising a negotiation engine configured to generate a template corresponding to the first party, the template comprising a control objective of the first party.

17. The system of claim 13, further comprising a negotiation engine configured to:

generate a template corresponding to the first party, the template comprising a control objective of the first party; and provide the template to the second party to initiate negotiation between the first party and the second party.

18. The system of claim 13, further comprising a negotiation engine configured to negotiate the control definition of the one or more control definitions.

19. The system of claim 13, further comprising a negotiation engine configured to:

determine a control objective agreed upon by the first party and the second party;

generate the control definition of the one or more control definitions in accordance with the control objective; and negotiate the control definition of the one or more control definitions.

20. The system of claim 13, the processor configured to:

establish a community comprising the first party, the second party, and a third party having a third information resource;

collect data associated with the one or more control definitions; and report the data.

21. The system of claim 13, the processor configured to:

collect data associated with the one or more control definitions;

generate a statistic using the data; and report the statistic.

22. The system of claim 13, the processor configured to:

provide access to a third party monitoring service to the second party; and receive the meta-data from the second monitor through the third party monitoring service.

23. The system of claim 13, further comprising an engine configured to test the control definition to determine whether the control definition operates as defined.

24. The system of claim 13, further comprising an improvement engine configured to:

identify an opportunity to change the one or more control definitions; and change the one or more control definitions in response to identifying the opportunity.

25. One or more computer readable storage media storing with one or more tangible embodied instructions for controlling one or more information resources, the instructions executable by a processor and configured to:

establish, by a shared control hub, a relationship between a first party and a second party based on information about the first party and the second party prior to initiating a negotiation between the first party and the second party, the relationship defining at least in part how the first party and the second party negotiate a control definition of one or more control definitions associated with the first party and the second party;

initiate, after establishing the relationship between the first party and the second party, by the shared control hub, negotiation between the first party and the second party of the control definition of the one or more control definitions associated with the first party and the second party using the established relationship, the shared control hub not a party of the negotiation, the control definition defined according to a shared framework of control, the first party having a first information resource, the second party having a second information resource, the first information resource exchanging business information with the second information resource, the one or more control definitions defining a practice for monitoring the first information resource and the second information resource, each control definition of the one or more control definitions having a condition and a consequence;

communicate a proposal for the condition of the control definition between the first party and the second party, the proposal proposing a first parameter describing a first vital sign indicating operation of the first information resource and a parameter second describing a second vital sign indicating operation of the second information resource;

receive meta-data from a first monitor corresponding to the first information resource and a second monitor corresponding to the second information resource, the meta-data describing the first vital sign indicating operation of the first information resource and the second vital sign indicating operation of the second information resource; and apply the condition of the control definition of the one or more control definitions to the meta-data in order to monitor the first information resource and the second information resource;

determine from the meta-data that there is a violation of the control definition; and notify the first party and the second party.

26. The media of claim 25, the instructions further configured to initiate the consequence in accordance with the application of the condition to the meta-data.

27. The media of claim 25, the instructions further configured to initiate a response process to mitigate damage in accordance with the application of the condition to the meta-data.

28. The media of claim 25, the instructions further configured to generate a template corresponding to the first party, the template comprising a control objective of the first party.

29. The media of claim 25, the instructions further configured to:
generate a template corresponding to the first party, the template comprising a control objective of the first party; and
provide the template to the second party to initiate negotiation between the first party and the second party.

30. The media of claim 25, the instructions further configured to negotiate the control definition of the one or more control definitions.

31. The media of claim 25, the instructions further configured to:
determine a control objective agreed upon by the first party and the second party;
generate the control definition of the one or more control definitions in accordance with the control objective; and
negotiate the control definition of the one or more control definitions.

32. The media of claim 25, the instructions further configured to:
establish a community comprising the first party, the second party, and a third party having a third information resource;
collect data associated with the one or more control definitions; and
report the data.

33. The media of claim 25, the instructions further configured to:
collect data associated with the one or more control definitions;
generate a statistic using the data; and
report the statistic.

34. The media of claim 25, the instructions further configured to:
provide access to a third party monitoring service to the second party; and
receive the meta-data from the second monitor through the third party monitoring service.

35. The media of claim 25, the instructions further configured to test the control definition to determine whether the control definition operates as defined.

36. The media of claim 25, the instructions further configured to:
identify an opportunity to change the one or more control definitions; and
change the one or more control definitions in response to identifying the opportunity.

37. A method for controlling one or more information resources, comprising:
establishing, by a processor of a shared control hub, a relationship between a first party and a second party based on information about the first party and the second party prior to generating a template for negotiation between the first party and the second party, the relationship defining at least in part how the first party and the second party negotiate a control definition of one or more control definitions associated with the first party and the second party;
generating, after establishing the relationship between the first party and the second party, the template for negotiation between the first party and the second party, the template comprising a control objective of the first party, the first party having a first information resource exchanging business information with a second information resource of the second party;
providing the template to the second party to initiate negotiation between the first party and the second party;
determining, by the processor of the shared control hub, a control objective agreed upon by the first party and the second party using the established relationship, the shared control hub not a party of the negotiation;
generating, by the processor, the control definition of the one or more control definitions in accordance with the control objective, the control definition defined according to a shared framework of control, the one or more control definitions defining a practice for monitoring the first information resource and the second information resource, each control definition of the one or more control definitions having a condition and a consequence;

communicate a proposal for the condition of the control definition between the first party and the second party, the proposal proposing a first parameter describing a first vital sign indicating operation of the first information resource and a second parameter describing a second vital sign indicating operation of the second information resource;

receiving an acceptance of the control definition from the second party;

receiving meta-data from a first monitor corresponding to the first information resource and a second monitor corresponding to the second information resource, the meta-data describing the first vital sign indicating operation of the first information resource and the second vital sign indicating operation of the second information resource, the meta-data received by providing access to a third party monitoring service to the second party, and by receiving the meta-data from the second monitor through the third party monitoring service;

applying, by the processor, the condition of the control definition of the one or more control definitions to the meta-data in order to monitor the first information resource and the second information resource;

determining from the meta-data that there is a violation of the control definition;

notifying the first party and the second party;

initiating the consequence in accordance with the application of the condition to the meta-data by initiating a response process to mitigate damage in accordance with the application of the condition to the meta-data, and by initiating a settlement process to share a cost resulting from the violation;

establishing a community comprising the first party, the second party, and a third party having a third information resource;

collecting data associated with the one or more control definitions;

generating a statistic using the data; and reporting the statistic.

* * * * *